United States Patent
Rogers (10) Patent No.: US 9,332,437 B2
(45) Date of Patent: May 3, 2016

(54) SECURITY CONFIGURATION ALIGNMENT (71) Applicant: Nvidia Corporation, Santa Clara, CA (US)

(72) Inventor: Timothy Rogers, Cambridge (GB)

(73) Assignee: Nvidia Corporation, Santa Clara, CA (US)

(*) Notice: Subject to any disclaimer, the term of this patent is extended or adjusted under 35 U.S.C. 154(b) by 197 days.

(21) Appl. No.: 14/025,060

(22) Filed: Sep. 12, 2013

(65) Prior Publication Data
US 2015/0072647 A1 Mar. 12, 2015

(51) Int. Cl.
*H04M 1/66* (2006.01)
*H04W 12/08* (2009.01)
*H04L 29/06* (2006.01)
*H04W 76/04* (2009.01)

(52) U.S. Cl.
CPC ............. *H04W 12/08* (2013.01); *H04L 63/205* (2013.01); *H04W 76/046* (2013.01)

(58) Field of Classification Search
CPC .. H04W 36/0038; H04W 12/08; H04W 24/08
USPC .......................................... 455/411; 370/338
See application file for complete search history.

(56) References Cited

U.S. PATENT DOCUMENTS

| | | | |
|---|---|---|---|
| 2011/0263222 A1* | 10/2011 | Farnsworth et al. | 455/410 |
| 2012/0275340 A1* | 11/2012 | McGann | 370/254 |
| 2013/0039339 A1* | 2/2013 | Rayavarapu et al. | 370/331 |

OTHER PUBLICATIONS

"3rd Generation Partnership Project; Technical Specification Group Radio Access Network; Radio Resource Control (RRC); Protocol Specification (Release 11)," 3GPP TS 25.331, V11.6.0, Jun. 2013, 2084 pages.

* cited by examiner

*Primary Examiner* — Marcos Batista (57) ABSTRACT

A wireless communications device is disclosed herein. In one embodiment, the wireless communication device includes: a transceiver configured to facilitate communications with a radio access network; and a processing unit configured to: determine that a cell update message is to be transmitted to the network; determine if a security mode configuration procedure is in progress at the device; and if a security mode configuration procedure is not in progress, transmit a second type of cell update message to the network entity, the second type of cell update message not including an indicator indicating that the device has not had to abort an on-going security procedure and in place of said indicator including information not pertaining to a security procedure.

27 Claims, 7 Drawing Sheets

SECURITY CONFIGURATION ALIGNMENT

BACKGROUND

In a communication system, a device (typically a mobile device) termed user equipment (UE) communicates wirelessly with a radio access network. Communications between the UE and the radio access network are effected in accordance with a multi-layered communications protocol.

Figure 1:
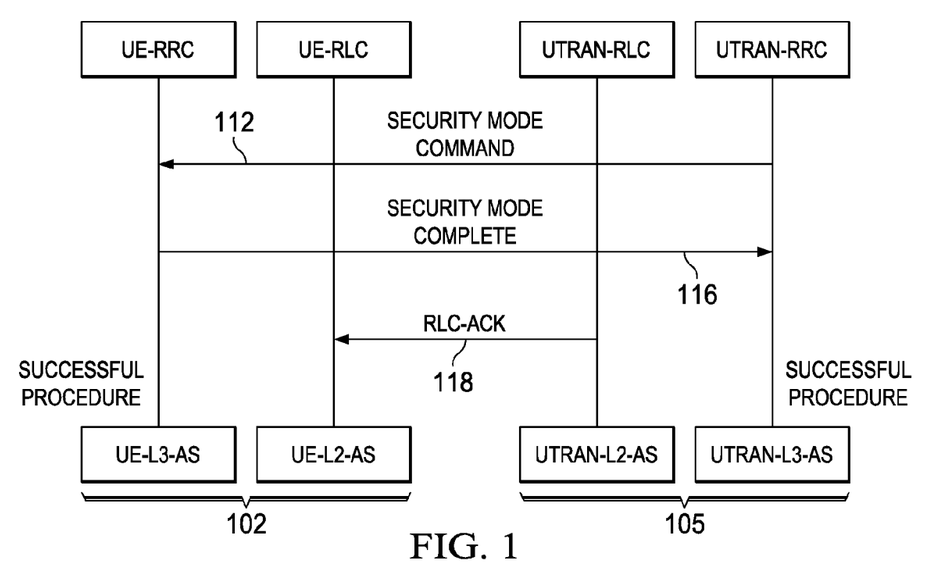
FIG. 1 shows a security procedure.

The 3GPP 25.331 specification classifies a Security Mode Command procedure shown in FIG. 1 between the UE 102 and the radio access network 105.

The security consists of two aspects, optional ciphering and mandatory integrity protection. Ciphering provides encryption according to a ciphering configuration to ensure that all signaling and data messages transmitted between the UE and the radio access network are ciphered over the air interface to provide data confidentiality. Integrity protection provides protection against message manipulation between the UE and the radio access network. That is, integrity protection prevents third parties from sending unauthorized signaling messages between the UE and radio access network. Typically, both ciphering and integrity protection are enabled during a call.

As part of the Security Mode Command procedure the radio access network sends a Security Mode Command 112 using the Radio Resource Control (RRC) protocol to the UE with an indication of a new integrity protection configuration and new cipher configuration. In response to the Security Mode Command, the UE sends an RRC Security Mode Complete message 116 to the radio access network. In response to receiving the Security Mode Complete message from the UE, the radio access network sends an acknowledgement message 118 to the UE.

The 3GPP 25.331 specification mandates a specific method to handle a Cell Update procedure during the security mode command procedure. This method is to abort the new integrity protection configuration and new cipher configuration, and continue with the original integrity protection configuration and cipher configuration (used prior to initiation of the security mode command procedure).

This is problematic because the Security Mode Command procedure terminates at different times in the UE and the radio access network, which can lead to the abortion of the Security Mode Command procedure in the UE but not in the radio access network or vice versa. If the UE and radio access network do not abort the Security Mode Command procedure simultaneously, ciphering and integrity protection configuration will be not be the same in the UE and the radio access network which leads to the RRC connection to be lost.

In release 10 of the 3GPP 25.331 specification, change requests have been introduced and subsequently corrected to mitigate problems of security mode command failures. These change requests are 4427 (November 2010), 4583 (May 2011), and 4884 (November 2011) all applying to the 3GPP 25.331 specification.

These change requests introduce a single bit indication, the information element (IE) "Security Revert Status Indicator" to the Cell Update Message giving the status of the UE for the Security Mode Command procedure.

SUMMARY

According to a first aspect of the disclosure there is provided a wireless communications device. In one embodiment the wireless communications device includes: a transceiver configured to facilitate wireless communications with a radio access network; and a processing unit configured to: determine, that a cell update message is to be transmitted to the radio access network; determine if a security mode configuration procedure for reconfiguring security parameters of the wireless communications device is in progress at the wireless communications device; if a security mode configuration procedure is in progress, abort the security mode configuration procedure and transmit a first type of cell update message to a network entity of the radio access network via the transceiver, the first type of cell update message including an indicator that the wireless communications device has aborted the security mode configuration procedure; and if a security mode configuration procedure is not in progress, transmit a second type of cell update message to the network entity of the radio access network via the transceiver, the second type of cell update message not including an indicator indicating that the wireless communications device has not had to abort an on-going security mode configuration procedure and in place of the indicator including information not pertaining to a security mode configuration procedure.

According to another aspect of the disclosure there is provided a computer program product for implementing a cell update procedure at a wireless communications device including a transceiver configured to facilitate wireless communications with a radio access network. In one embodiment the computer program product includes code embodied on a non-transient computer-readable medium and configured so as when executed on a processing apparatus of the wireless communications device to: determine that a cell update message is to be transmitted to the radio access network; determine if a security mode configuration procedure for reconfiguring security parameters of the wireless communications device is in progress at the wireless communications device; if a security mode configuration procedure is in progress, abort the security mode configuration procedure and transmit a first type of cell update message to a network entity of the radio access network via the transceiver, the first type of cell update message including an indicator that the wireless communications device has aborted the security mode configuration procedure; and if a security mode configuration procedure is not in progress, transmit a second type of cell update message to the network entity of the radio access network via the transceiver, the second type of cell update message not including an indicator indicating that the wireless communications device has not had to abort an on-going security mode configuration procedure and in place of the indicator including information not pertaining to a security mode configuration procedure.

According to another aspect of the disclosure there is provided a network entity of a radio access network. In one embodiment, the network entity includes: a network interface for facilitating wireless communications with a wireless communications device; at least one buffer for storing messages that have been transmitted to the wireless communications device, the at least one buffer configured to store a transmitted message until the network entity receives an acknowledgement acknowledging delivery of the message at the wireless communications device; and a processing unit configured to: receive a cell update message from the wireless communications device via the network interface; determine if a security mode configuration procedure for reconfiguring security parameters of the wireless communications device is in progress at the network entity; if a security mode configuration procedure is in progress at the network entity, abort the security mode configuration procedure and revert back to using original security parameters used prior to initiation of the security mode configuration procedure, and discard any message stored in the at least one buffer; and if a security mode configuration procedure is not in progress at the network entity, determine if the received cell update message comprises an indicator indicating that the wireless communications device has aborted a security mode configuration procedure completed at the network entity, wherein if the received cell update message comprises the indicator, the processing unit configured to revert back to using original security parameters used prior to completion of the security mode configuration procedure completed at the network entity.

According to another aspect of the disclosure there is provided a computer program product for implementing a cell update procedure at a network entity, the network entity including a network interface for facilitating wireless communications with a wireless communications device and at least one buffer for storing messages that have been transmitted to the wireless communications device, the at least one buffer configured to store a transmitted message until the network entity receives an acknowledgement acknowledging delivery of the message at the wireless communications device. In one embodiment the computer program product includes code embodied on a non-transient computer-readable medium and configured so as when executed on a processing apparatus of the network entity to: receive a cell update message from the wireless communications device via the network interface; determine if a security mode configuration procedure for reconfiguring security parameters of the wireless communications device is in progress at the network entity; if a security mode configuration procedure is in progress at the network entity, abort the security mode configuration procedure and revert back to using original security parameters used prior to initiation of the security mode configuration procedure, and discard any message stored in the at least one buffer; and if a security mode configuration procedure is not in progress at the network entity, determine if the received cell update message comprises an indicator indicating that the wireless communications device has aborted a security mode configuration procedure completed at the network entity, wherein if the received cell update message comprises the indicator, the processing unit configured to revert back to using original security parameters used prior to completion of the security mode configuration procedure completed at the network entity.

BRIEF DESCRIPTION OF THE DRAWINGS

For a better understanding of the disclosure and to show how the same may be put into effect, reference will now be made, by way of example, to the following drawings in which.

DETAILED DESCRIPTION

The disclosure recognizes that there are detrimental consequences of the 3GPP method introduced in the above Change requests.

These detrimental consequences arise from the Cell Update Message being sent on the common control channel (CCCH) which has a fixed and limited Service Data Unit (SDU) size. The CCCH SDUs are contained entirely in one CCCH Radio Link Control (RLC) Protocol Data Unit (PDU), that is no segmentation or concatenation are used in RLC. Further the CCCH is transmitted on the Random Access Channel (RACH) which has a limited RLC PDU size due to the physical channel properties. The SDU size is specified in bits.

The UE 102 is configured to measure the radio environment that the UE is operating in and report these measurements to the radio access network. The measurements can be based on the current serving cell and/or neighbouring cells. The RACH transport channel can be used for measurement reporting, and measurement result information is configured to be included in a Cell Update message, using 'Measured results on RACH' IEs.

'Measured results on RACH' IEs are a list of cells that have been measured by the UE 102. Which cells and how many can be reported are all configurable by the UTRAN 105, but it may contain up to 8 intra frequency cell measurements, and 8 inter frequency cell measurements. If there are not enough bits for all IE's in the Cell Update message then members of the list are dropped until the number of bits in the Cell Update message is less than the CCCH SDU size. This may result in a full set of results, a partial set of results, or no results. That is, 'Measured results on RACH' IEs are reduced or even omitted entirely. Therefore the UTRAN may have limited or even no information to determine current cell levels for the UE 102. This may result in failed configurations, in particular establishment of Dedicated Transport Channels (DCH), because the wrong radio links were configured by the UTRAN.

Accordingly, disclosed herein are embodiments that address the above noted problems and these embodiments will now be described by way of example only.

Figure 2:
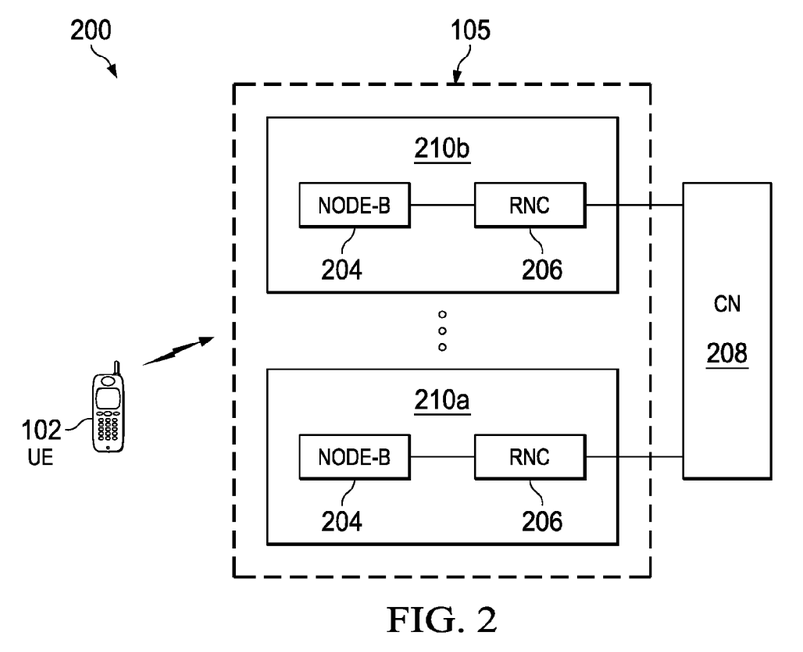
FIG. 2 shows a UMTS mobile communication system.

With reference to FIG. 2, there is illustrated the main elements of a UMTS communication system, generally denoted by reference numeral 200. It will be understood that in FIG. 2 only sufficient elements of the system are shown in order to present the context of some arrangements of the disclosure.

The UMTS communication system 200 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 210a, 210b. A radio network sub-system is a sub-network within the UTRAN 105 and comprises a base station 204 (termed node-B) and a radio network controller (RNC) 206. A node-B 204 is a transceiver which sends and receives wireless signals and defines a cell region. A RNC 206 is the network element responsible for the control of the radio resources of the UTRAN 105. A dedicated physical channel is established between the UE 102 and the node-B 204 to allow data communication to take place there between. It will be appreciated that a plurality of UEs and radio network sub-systems may be present in the UTRAN 105, which for clarity purposes are not shown. The UTRAN 105 is in communication with a core network 208. The structure of a UMTS mobile communication system as illustrated in FIG. 2 is well-known to one skilled in the art, and the further operation of such a system is not described herein.

Figure 3:
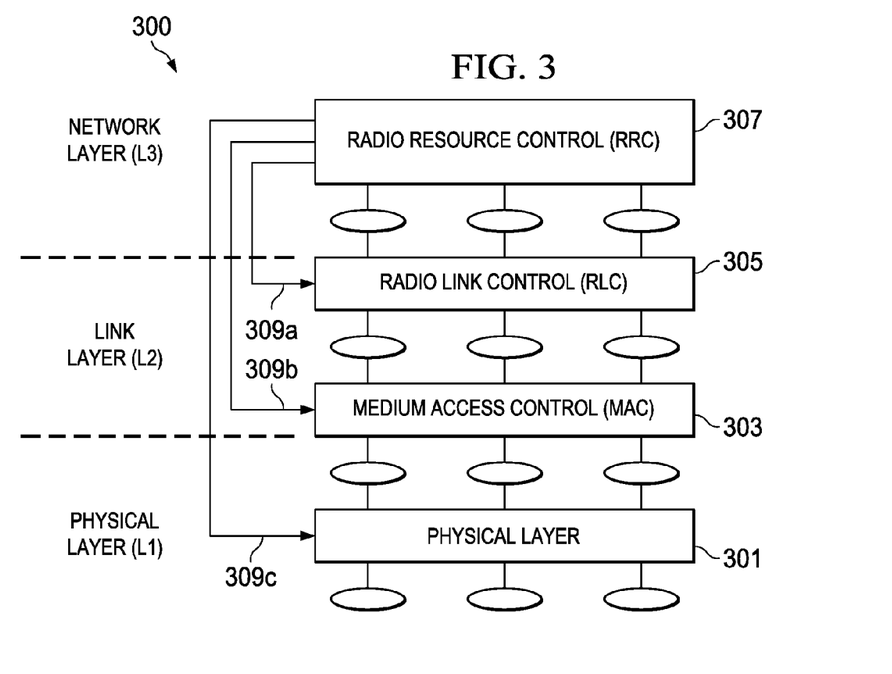
FIG. 3 shows a block diagram of a UMTS radio interface protocol architecture.

Referring to FIG. 3, there is shown a simplified block diagram of a UMTS radio interface protocol architecture 300. Communications between the UE 102 and the UTRAN 105 are effected in accordance with the multi-layered communications protocol shown in FIG. 3. The protocol stack comprises a first layer (L1) which includes a physical layer 301, above the first layer is a second layer (L2) which includes a Medium Access Control (MAC) layer 303 and a Radio Link Control (RLC) layer 305, and above the second layer is a third layer (L3) which includes a Radio Resource Control (RRC) layer 307. Both the UE 102 and RNC 206 handle information in accordance with the multi-layered communications protocol shown in FIG. 3. In the illustrated embodiment, the node-B handles information at the first layer (L1) only.

When data is transmitted from the UE 102 to the UTRAN 105, at the UE 102 data is passed from the RLC layer 305 to the MAC layer 303 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 303 the logical channels are mapped to transport channels. In the physical layer 301 the transport channels are mapped onto physical channels. Thus with reference to FIG. 3, it can be seen that during a data transmission from the UE 102 to the UTRAN 105 data is passed down through the layer architecture 200. Similarly, when data is received at the UE 102 from the UTRAN 105, data is passed up through the layer architecture 300.

Control interfaces 309 between the RRC layer 307 and all the lower layer protocols are used by the RRC layer 307 to configure characteristics of the lower layer protocol entities, including parameters for the physical, transport and logical channels. The control interfaces 309 are used by the RRC layer 307 to command the lower layers to perform certain types of measurement and by the lower layers to report measurement results and errors to the RRC layer 307.

The RLC layer 305 provides services to higher layers for the transfer of user and/or control data. The service provided for user data is called Radio Bearer (RB) and the service provided for control data is called Signaling Radio Bearer (SRB). A SRB is associated with a signaling radio bearer queue and a logical channel. The RLC layer 305 may comprise multiple SRB's such that each SRB is associated with a signaling radio bearer queue and a logical channel.

In this embodiment, integrity protection is applied at the RRC layer 307 only and only the signaling messages are integrity protected. The integrity protection is applied separately to each active SRB. The data radio bearers are not integrity protected. Ciphering is optional and is done for DCCH signaling as well as data radio bearers. For radio bearers using Acknowledged Mode (AM) or Unacknowledged Mode (UM) of operation, ciphering is done in the RLC layer 305. For radio bearers using Transparent Mode (TM) mode of operation, ciphering is done in the MAC layer 303. The ciphering process applies separately to each active radio bearer.

A cell update procedure may be triggered during a Security Mode Command procedure shown in FIG. 1.

Figure 4:
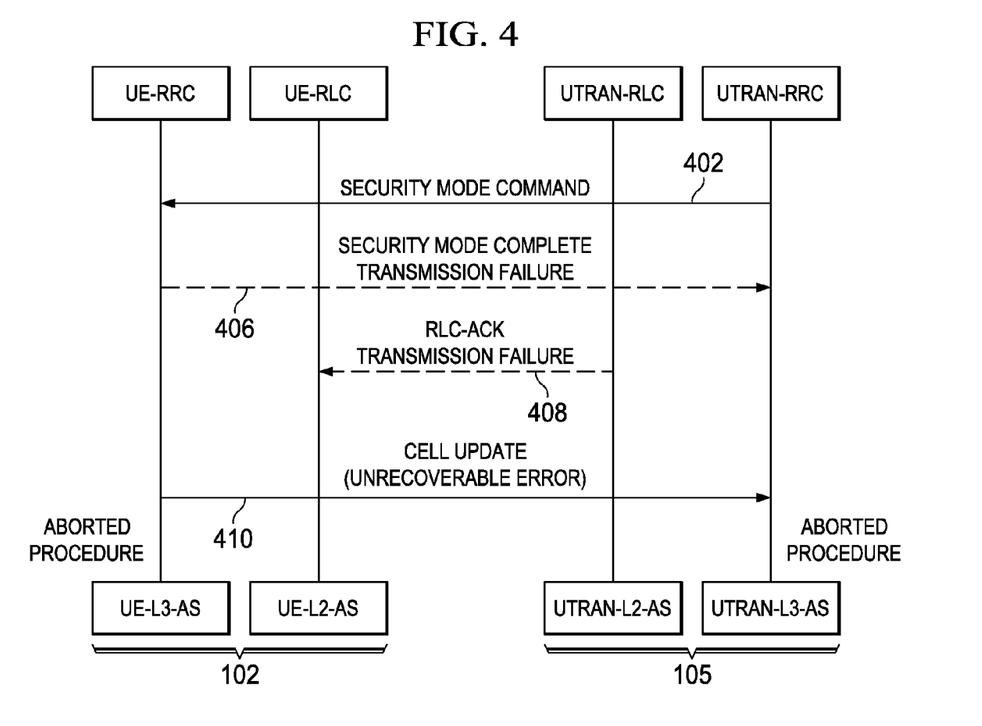
FIG. 4 shows the abortion of a security procedure.

FIG. 4 illustrates an exemplary scenario in which both the UE 102 and UTRAN 105 abort the Security Mode Command procedure.

As part of the Security Mode Command procedure the UTRAN 105 sends a Security Mode Command message 402 to the UE 102 using the RRC protocol on the downlink (DL). The Security Mode Command message 402 is sent using SRB2 (on the DCCH using AM RLC). In response to the receipt of this message, the UE 102 transmits a Security Mode Complete message 406 on the uplink (UL) to the UTRAN 105. The Security Mode Command Complete message 406 is sent using SRB2 (on the DCCH using AM RLC). If there are poor radio conditions in the network the UTRAN 105 may not receive the Security Mode Complete message 406, resulting in a transmission failure. This is denoted in FIG. 4 by the dashed arrow. Since the UTRAN 105 did not receive the Security Mode Command Complete message 406 from the UE 102, it will not send an acknowledgement message (RLC-ACK) 408 back to the UE 102 (also denoted by the dashed arrow).

The poor radio conditions could lead to the UE 102 to initiate a Cell Update procedure by transmitting a Cell Update message 410 to the UTRAN 105. As mandated in the 3GPP 25.331 specification, the transmission of a Cell Update message before the receipt of the acknowledgement message (RLC-ACK) 408 causes the UE 102 to abort the Security Mode Command procedure. Moreover, since the UTRAN 105 receives the Cell Update message 410 on the UL before receiving the Security Mode Command Complete Message 406, it too aborts the Security Mode Command procedure.

Following the abortion of the Security Mode Command procedure at the UE 102, the UE 102 will revert back to using the "original" integrity and ciphering algorithms used prior to receiving the Security Mode Command message 402 from the UTRAN 105. Similarly, following the abortion of the Security Mode Command procedure at UTRAN 105, the UTRAN 105 will revert back to using the "original" integrity and ciphering algorithms used prior to transmitting the Security Mode Command message 402 to the UE 102.

Figure 5:
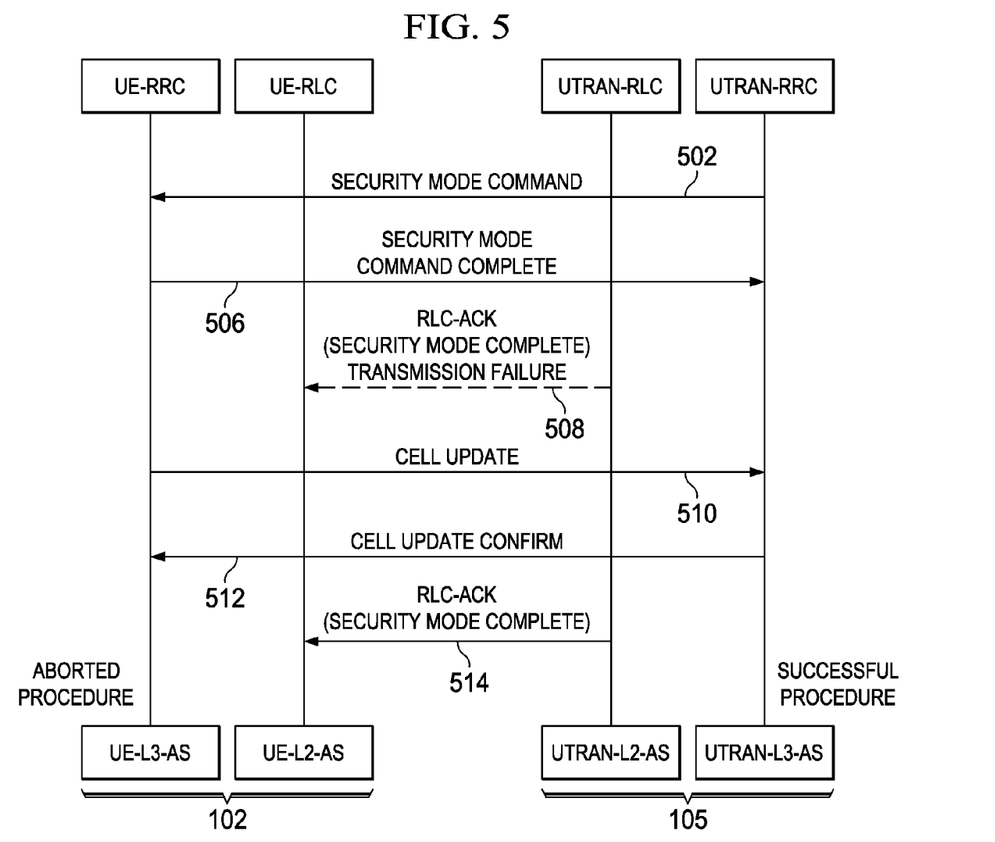
FIG. 5 shows a breakdown in a security procedure.

FIG. 5 illustrates a scenario which results in the completion of the Security Mode Command procedure at the UTRAN 105 but an aborted procedure at the UE 102.

As part of a Security Mode Command procedure the UTRAN 105 transmits a Security Mode Command message 502 on the DL to the UE 102. On the UL the UE 102 then transmits an RRC Security Mode Command Complete message 506 to the UTRAN 105. The UTRAN 105 completes the Security Mode Command procedure upon receipt of the Security Mode Command Complete message 506.

The UE 102 does not complete the Security Mode Command procedure until it receives the acknowledgement message RLC-ACK (Security Mode Complete) 508 from the UTRAN 105.

Poor radio conditions could lead to the transmission failure of the acknowledgment message 508. Similarly to the scenario described above, the poor radio conditions could lead to the UE 102 initiating a Cell Update procedure by transmitting a Cell Update message 510 to the UTRAN 105. The Cell Update message 510 is sent using SRB0 (on CCCH). In response, the UTRAN 105 sends back to the UE 102 a Cell Update Confirm Message 512. The Cell Update Confirm Message 512 is sent using SRB0 (on CCCH) or on SRB1 (on the DCCH using UM RLC). A re-transmitted RLC-ACK (Security Mode Complete) message 514 is received on the DL at the UE 102, however this message does not complete the Security Mode Command procedure at the UE 102 as the procedure had previously been aborted at the UE 102 upon transmission of the Cell Update message 510.

The transmission of the Cell Update message 510 from the UE 102 before the receipt of the acknowledgement message 514 causes the UE 102 to abort the Security Mode Command procedure. During a Security Mode Command procedure the RRC layer 307 of the UTRAN 105 cannot ascertain when the RLC-ACK message has been received by the UE 102 and thus is not aware when the RRC Security Mode Command procedure has been completed at the UE 102.

In this example the triggering of the Cell Update message during the Security Mode Command procedure causes the UTRAN 105 to complete the procedure and the UE 102 to abort the procedure, with the effect that the UE 102 will continue to employ the "original" integrity and ciphering algorithms used prior to the initiation of the Security Mode Command procedure, whilst the UTRAN will employ "new" integrity and ciphering algorithms as determined by the Security Mode Command procedure.

There is therefore a breakdown of the security mode command procedure caused by the resulting security mode mismatch.

Figure 6:
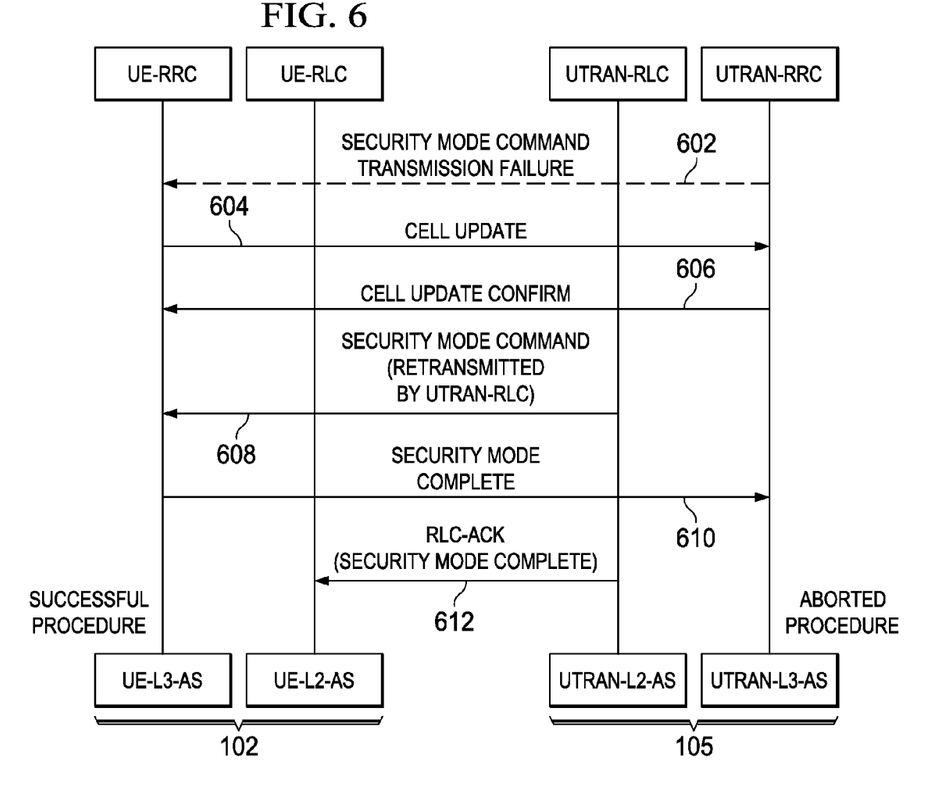
FIG. 6 shows a breakdown in a security procedure.

FIG. 6 illustrates a scenario which results in the completion of the Security Mode Command procedure at the UE 102 but an aborted procedure at the UTRAN 105.

As part of a Security Mode Command procedure the UTRAN 105 transmits a Security Mode Command message 602 on the DL to the UE 102. A transmission failure of the Security Mode Command message 602 (designated by the dashed arrow in FIG. 6) could be caused by, for example, poor radio conditions. It is worth noting that as a consequence of the transmission failure of the Security Mode Command message 602, an RLC-ACK (Security Mode Command) message is not sent on the UL to the UTRAN 105.

The presence of poor radio conditions typically causes the UE 102 to initiate a Cell Update procedure by transmitting a Cell Update message 604 to the UTRAN 105. The UTRAN 105 completes the Cell Update procedure by transmitting a Cell Update Confirm message 606 back to the UE 102. The transmission failure of the DL Security Mode Command message 602 will mean that no UL Security Mode Command Complete message will be transmitted to the UTRAN 105. Therefore the Cell Update procedure initiated by the UE 102 causes the UTRAN 105 to abort the Security Mode Command procedure, as mandated by the standard.

Although the RRC Security Mode Command procedure has been aborted at the UTRAN 105, the failure of the UTRAN RLC layer 305 to receive an RLC-ACK message in response to transmitting the Security Mode Command message 602 causes the Security Mode Command to be re-transmitted from the UTRAN RLC layer 305 in a Security Mode Command re-transmit message 608 (because the Security Mode Command message is sent in acknowledgement mode). The RRC layer 307 of the UE 102 is unaware that the Security Mode Command message 608 is a re-transmitted message and so transmits a Security Mode Complete message 610 on the UL. In response, the RLC layer 305 of the UTRAN 105 transmits an acknowledgement message RLC-ACK (Security Mode Complete) 612 to the UE, which completes the Security Mode Command procedure at the UE 102.

Although a Security Mode Complete message 610 is received at the UTRAN 105, the UTRAN 105 does not complete the security mode command procedure as the procedure had previously been aborted at the RRC layer 307 in response to receiving the Cell Update message 604. Despite the procedure being aborted at the RRC layer 307 of the UTRAN 105, the UTRAN 105 re-transmits the new security mode configurations of the aborted procedure in Security Mode Command message 608 using the RLC protocol operating in acknowledgement mode. This leads to the completion of the Security Mode Command procedure at the UE 102 and a failure of the procedure at the UTRAN 105, with the effect that the UE 102 is now configured to use the new security mode configurations and the UTRAN 105 has reverted back to the original security mode configurations.

The use of the term "original" here denotes the ciphering and/or integrity algorithm that the UE 102 was arranged to use for handling data transmissions to and from the UTRAN 105 before the UE 102 received the Security Mode Command message from the UTRAN 105 with an indication of a new ciphering and/or integrity algorithm to be used.

As will be apparent from the above, in the scenarios of FIGS. 5 and 6 the transmission of the Cell Update message causes a breakdown of the Security Mode Command procedure due to the resulting security mode mismatch.

As indicated above, prior art methods overcome this breakdown of the Security Mode Command procedure by introducing a single bit indication, the IE "Security Revert Status Indicator" to the Cell Update Message giving the status of the UE for the Security Mode Command procedure. If the UE has reverted back to an old security configuration by aborting an on-going Security Mode Command procedure as the Cell Update procedure was initiated, then the "Security Revert Status Indicator" in the Cell Update Message is set to "Reverted Back", otherwise the "Security Revert Status Indicator" in the Cell Update Message is set to a default value "Normal Operation". This can be problematic with the omission of 'Measured results on RACH' IEs being omitted in the Cell Update Message when having to include this indication in accordance with prior art methods.

Figure 7:
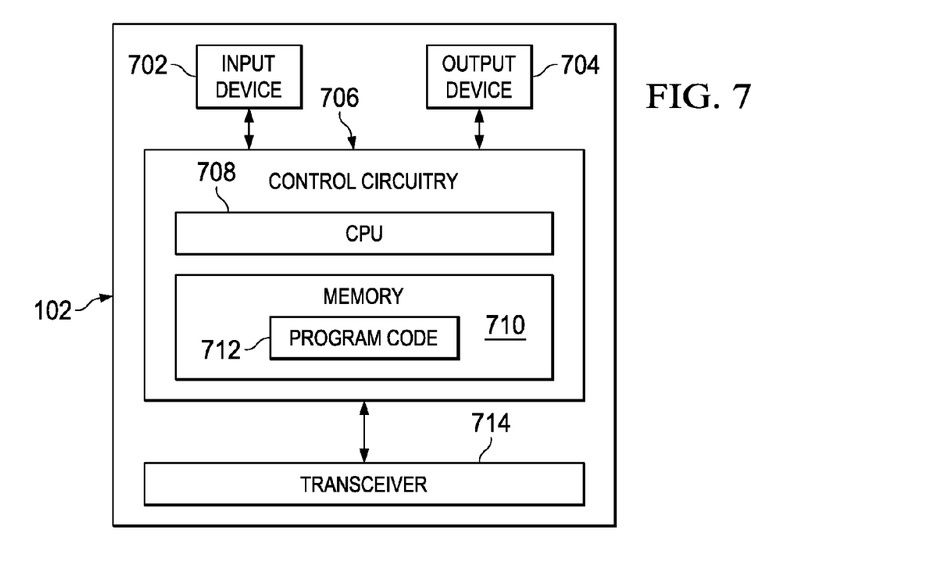
FIG. 7 is a block diagram of a user equipment.

FIG. 7 is a functional block diagram of a UE 102 according to the disclosure. For simplicity, FIG. 7 only shows an input device 702, an output device 704, a control circuit 706, a central processing unit (CPU) 708, a memory 710, program code 712, and a transceiver 714 of the UE 102. The UE 102 can receive signals input by a user of the UE 102 through the input device 702, such as a keyboard, and can output images and sounds through the output device 704, such as a display or speakers. The transceiver 714 is used to receive and transmit wireless signals, deliver received signals to the control circuit 706, and output signals generated by the control circuit 706 wirelessly. In the UE 102, the control circuit 706 executes the program code 712 stored in the memory 710 through the CPU 708, thereby controlling an operation of the UE 102. The features of the techniques described below are platform-independent, meaning that the techniques may be implemented on a variety of commercial computing platforms having a variety of processors. The program code 712 can be stored in one or more computer readable memory devices. The memory 710 may be volatile memory such as RAM or non-volatile memory such as flash (EEPROM). The memory 710 may be a component of the UE's circuitry or may be on machine-readable media, examples of which are well known in the art. Referring back to the UMTS radio interface protocol architecture 200 shown in FIG. 2, the transceiver 714 can be seen as a portion of Layer 1, and the control circuit 706 can be utilised to realise functions of Layer 2 and Layer 3.

The CPU 708 executes the program code 712 so as to implement at least a portion of the disclosure. The steps are detailed below and illustrated in the flowchart 800 of FIG. 8.

Figure 8:
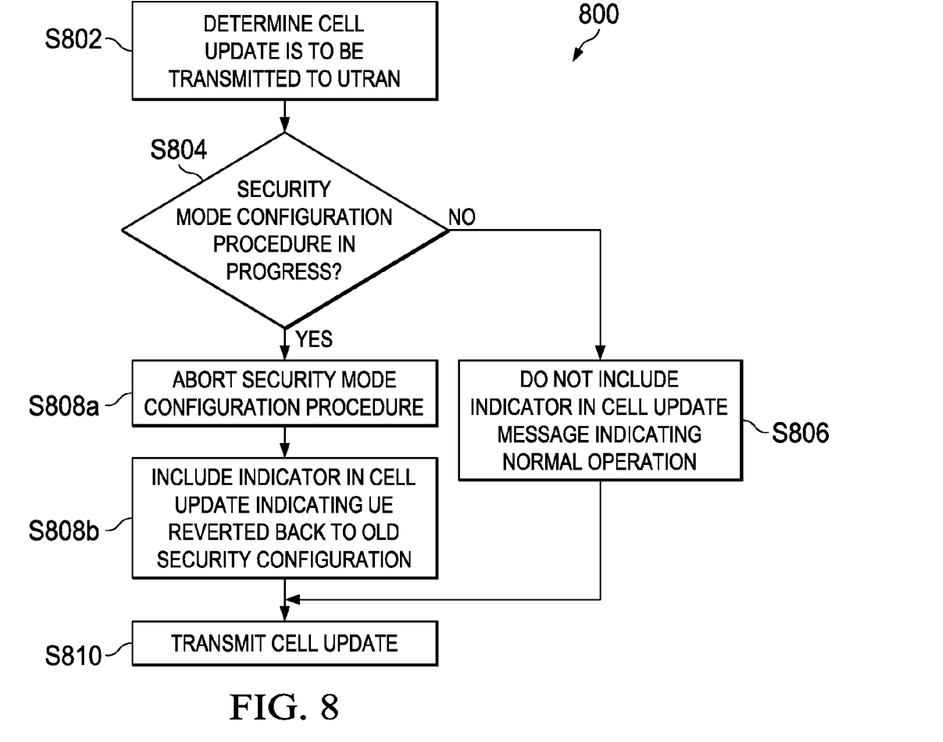
FIG. 8 is a flowchart of a process for performing a cell update procedure implemented at a user equipment.

At step S802 the UE 102 determines that a Cell Update procedure is to be initiated and therefore that a Cell Update Message is to be transmitted to the UTRAN 105.

The cell update procedure may be triggered at the UE 102 for a number of reasons well known to persons skilled in the art, for example cell reselection or re-entering service area if the UE 102 is in the CELL FACH RRC state, radio link failure if the UE 102 is in the CELL DCH RRC state, and rlc unrecoverable error in any RRC state.

The process 800 then proceeds to step S804. At step S804 the UE 102 determines if a Security Mode Command procedure is in progress at the UE 102.

Step S804 may be implemented by the UE 102 determining whether it has received a Security Mode Command from the UTRAN 105 but has not yet received an acknowledgement message from the UTRAN 105 acknowledging receipt of a Security Mode Command Complete message transmitted from the UE 102. If the UE 102 has received a Security Mode Command from the UTRAN 105 but has not yet received such an acknowledgement message from the UTRAN 105, then the UE 102 is able to determine that a Security Mode Command procedure is in progress. If the UE 102 determines at step S804 that a Security Mode Command procedure is in progress then the process 800 proceeds to step S808a.

At step S808a, the UE 102 aborts the Security Mode Command procedure (reverts back to using an original security configuration) and then at step S808b includes a security status indicator in the Cell Update message indicating that the UE 102 has reverted back to using an original security configuration. The security status indicator may comprise one or more bits of the Cell Update message. This Cell Update message is then transmitted from the UE 102 to the UTRAN 105 at step S810.

Referring back to step S804, if the UE 102 determines that a Security Mode Command procedure is not in progress then the process 800 proceeds to step S806. At step S806 the UE 102 does not include a security status indicator in the Cell Update message. That is, the UE 102 does not include a security status indicator in the Cell Update message indicating normal operation of the UE 102 i.e. that the UE has not had to abort an on-going Security Mode Command procedure. This enables the UE 102 to include information in the Cell Update message not pertaining to a Security Mode Command procedure. This Cell Update message is then transmitted from the UE 102 to the UTRAN 105 at step S810.

The disclosure recognizes that the vast majority of Cell Update Messages sent between the UE 102 and the UTRAN 105 will not abort an on-going Security Mode Command procedure. That is, in the majority of cases the process 800 will proceed to step S806 rather than step S808a.

It will be appreciated that when a security status indicator is not inserted in a Cell Update, this enables 'Measured results on RACH' IEs to be included in the Cell Update message that would otherwise be omitted from the Cell Update message in the event that the CCCH does not have enough bits for all IEs in the Cell Update message.

The UE 102 is able to make signal measurements on common pilot channels (CPICHs) transmitted from a serving cell and any neighboring cells. The signal measurements performed on the CPICH(s) may include the CPICH Ec/N0 (the received energy per chip divided by the power density in the band), the CPICH RSCP (Received Signal Code Power) the received power on one code, and the CPICH path loss. These measurements made by the UE 102 may be reported to the UTRAN 105 using the 'Measured results on RACH' IEs in the Cell Update message.

In this embodiment the security status indicator is only inserted in a Cell Update message and thus 'Measured results on RACH' IEs may potentially be omitted, in the unusual case when the transmission of a Cell Update message will abort an on-going Security Mode Command procedure.

Figure 9:
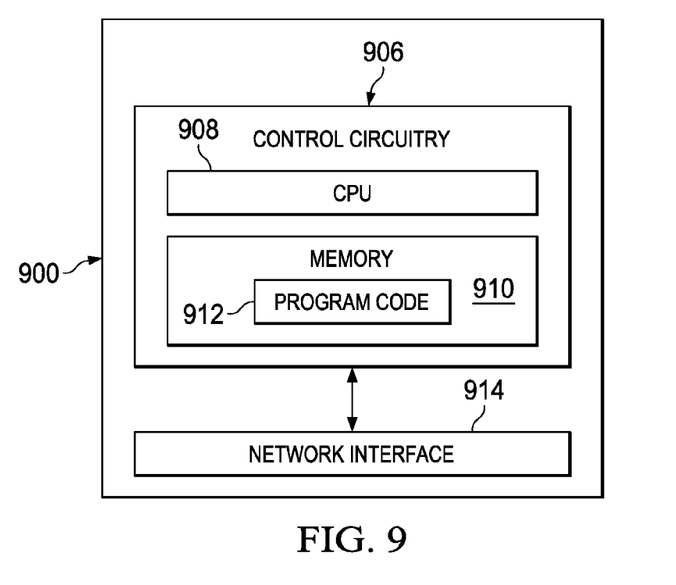
FIG. 9 is a block diagram of a network entity.

FIG. 9 is a functional block diagram of a network entity 900. The network entity 900 may comprise an RNC 206 in a UMTS system. The network entity 900 may comprise an eNodeB in an LTE system. For simplicity, FIG. 9 only shows a control circuit 906, a central processing unit (CPU) 908, a memory 910, program code 912, and a network interface 914 of the network entity 900.

The network interface 914 facilitates wireless communications with the UE 102. In particular, the network interface 914 is used to deliver received data to the control circuit 906, and transmit data generated by the control circuit 906. In a UMTS system, the network interface 914 is configured to be coupled to a Node-B 204. The network entity 900 can transmit and receive data to/from the UE 102 via the Node-B 204 using the network interface 914. In an LTE system, the network interface 914 comprises a transceiver for transmission and receipt of data to/from the UE 102.

In the network entity 900, the control circuit 906 executes the program code 912 stored in the memory 910 through the CPU 908, thereby controlling an operation of the network entity 900. The features of the techniques described below are platform-independent, meaning that the techniques may be implemented on a variety of commercial computing platforms having a variety of processors. The program code 912 can be stored in one or more computer readable memory devices. The memory 910 may be volatile memory such as RAM or non-volatile memory such as flash (EEPROM). The memory 910 may be a component of the network entity's circuitry or may be on machine-readable media, examples of which are well known in the art.

Figure 10:
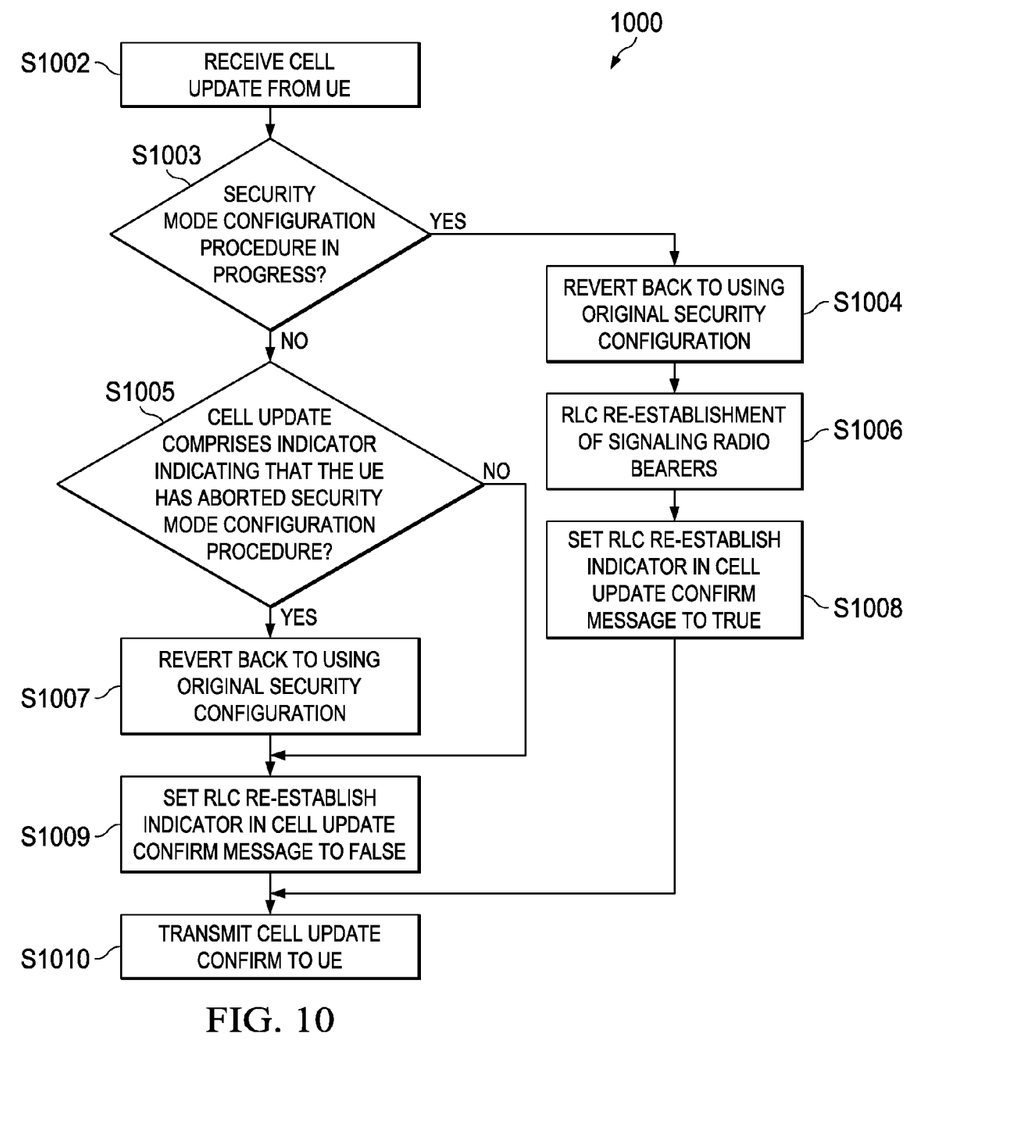
FIG. 10 is a flowchart of a process for performing a cell update procedure implemented at a network entity.

The CPU 908 executes the program code 912 so as to implement at least a portion of the disclosure. The steps are detailed below and illustrated in the flowchart 1000 of FIG. 10. The flowchart 1000 of FIG. 10 is described with reference to a UMTS system in which the network entity 900 comprises RNC 206.

At step S1002 the RNC 206 receives a Cell Update Message from the UE 102 via the node-B 204.

The process 1000 then proceeds to step S1003. At step S1003, the RNC 206 determines if a Security Mode Command procedure is in progress. The RNC 206 completes the Security Mode Command procedure upon receipt of a Security Mode Command Complete message from the UE 102. Therefore, the RNC 206 determines if it has transmitted a Security Mode Command message to the UE 102 but has not yet received a Security Mode Command Complete message from the UE 102 in order to make the determination at step S1003.

If it is determined at step S1003 that a Security Mode Command procedure is in progress, the RNC 206 aborts the Security Mode Command procedure and reverts back to the original security mode configuration at step S1004, and the process 1000 proceeds to step S1006. At step S1006 the RRC layer 307 at the RNC 206 instructs the RLC layer 305 at the RNC 206 to perform an RLC re-establishment of all of the Acknowledged Mode signaling radio bearers (SRB2, SRB3, and SRB4). In response to receiving this instruction, the RLC layer 305 at the RNC 206 performs an RLC re-establishment of signaling radio bearers (SRB2, SRB3, and SRB4). This causes all messages in RLC buffers at the RNC 206 associated with SRB2, SRB3 and SRB4 (messages transmitted to the UE 102 that haven't been acknowledged by the UE 102 as being delivered at the UE 102) to be discarded from the RLC buffers. The process 1000 then proceeds to step S1008.

At step S1008, the RRC layer 307 at the RNC 206 sets the IE "RLC re-establish indicator (RB2, RB3 and RB4)" in a Cell Update Confirm Message to true before transmitting this Cell Update Confirm Message to the UE 102 at step S1010.

Upon the RRC layer 307 at the UE 102 receiving the Cell Update Confirm message comprising the IE "RLC re-establish indicator (RB2, RB3 and RB4)" set to true, the RRC layer 307 at the UE 102 instructs the RLC layer 305 at the UE 102 to perform an RLC re-establishment of all of the Acknowledged Mode signaling radio bearers (SRB2, SRB3, and SRB4). This causes all messages in RLC buffers at the UE 102 associated with SRB2, SRB3 and SRB4 (messages transmitted to the RNC 206 that haven't been acknowledged by the RNC 206 as being delivered at the RNC 206) to be discarded from the RLC buffers.

Referring back to step S1003, if it is determined at step S1003 that a Security Mode Command procedure is not in progress at the RNC 206, the process 1000 proceeds to step S1005.

At step S1005, the RNC 206 reads the Cell Update message received at step S1002 and determines if the Cell Update message comprises a security status indicator indicating that the UE 102 has reverted back to using an original security configuration. If the Cell Update message comprises a security status indicator indicating that the UE 102 has reverted back to using an original security configuration, then the process 1000 proceeds to step S1007 where the RNC 206 reverts back to using an original security configuration (used prior to the most recent completion of a security mode command procedure). Following step S1007 the process 1000 proceeds to step S1009 where the RRC layer 307 at the RNC 206 sets the IE "RLC re-establish indicator (RB2, RB3 and RB4)" in a Cell Update Confirm Message to false before transmitting this Cell Update Confirm Message to the UE 102 at step S1010.

Referring back to step S1005, if the Cell Update message received at step S1002 does not comprise a security status indicator indicating that the UE 102 has reverted back to using an original security configuration then the RNC 206 continues using the security configuration that it is configured to use (following completion of a previous security mode command procedure) and the process 1000 proceeds to step S1009 where the RRC layer 307 at the RNC 206 sets the IE "RLC re-establish indicator (RB2, RB3 and RB4)" in a Cell Update Confirm Message to false before transmitting this Cell Update Confirm Message to the UE 102 at step S1010.

As will be apparent from the above, when a Security Mode Command procedure is not in progress when the Cell Update Confirm message is received, the RRC layer 307 at the RNC 206 does not instruct the RLC layer 305 at the RNC 206 to perform an RLC re-establishment of all of the Acknowledged Mode signaling radio bearers (SRB2, SRB3, and SRB4) prior to sending the Cell Update Confirm message to the UE 102 at step S1010.

The process 1000 avoids the security mode mismatch of FIG. 5 because on receiving the Cell Update message 510, the RNC 206 will determine at step S1003 that a Security Mode Command procedure is not in progress at the RNC 206, and that the Cell Update message 510 comprises a security status indicator indicating that the UE 102 has reverted back to using an original security configuration, at step S1005. Therefore the RNC 206 will revert back to using an original security configuration (used prior to the most recent completion of a security mode command procedure) at step S1007 and transmit a Cell Update Confirm message to the UE 102 at step S1010. Thus, the security configurations of the UE 102 and the UTRAN 105 will be aligned.

Figure 11:
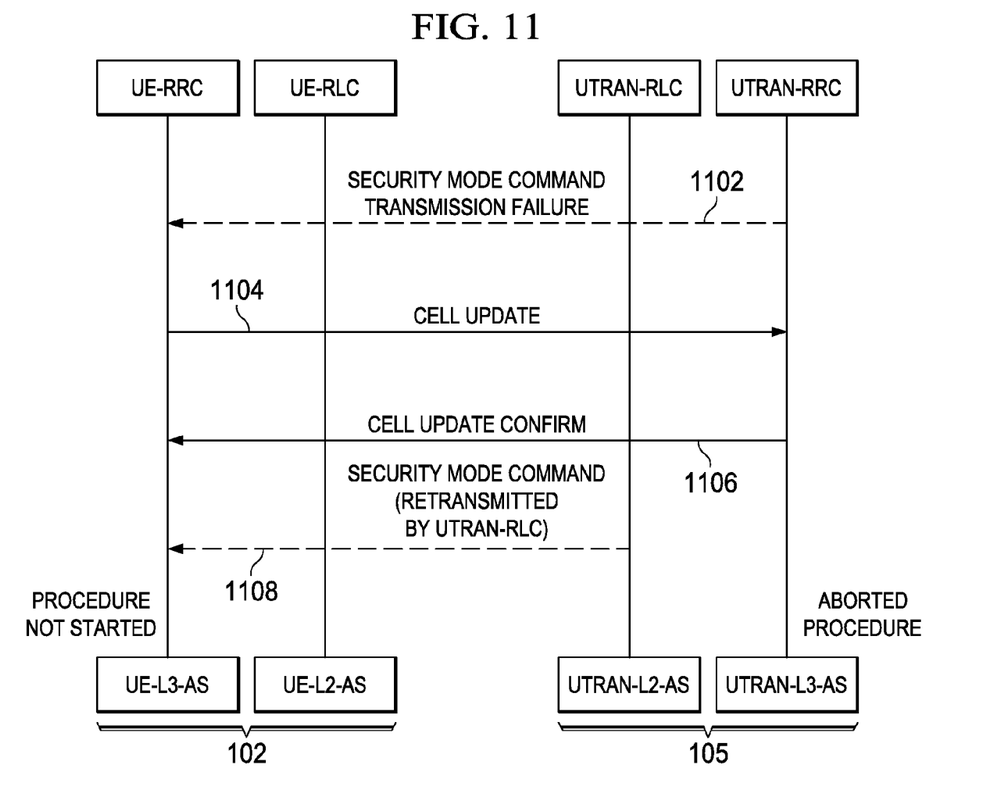
FIG. 11 illustrates how a breakdown in a security procedure is avoided in accordance with the disclosure.

Reference is now made to FIG. 11 which illustrates how the scenario of FIG. 6 is avoided in accordance with the disclosure.

As part of a Security Mode Command procedure the UTRAN 105 transmits a Security Mode Command message 1102 on the DL to the UE 102. The Security Mode Command message 1102 is held in the RLC buffer associated with SRB2 whilst waiting for an acknowledgement from the UE 102 that the Security Mode Command message has been safely received at the UE 102.

A transmission failure of the Security Mode Command message 1102 (designated by the dashed arrow in FIG. 11) could be caused by, for example, poor radio conditions. It is worth noting that as a consequence of the transmission failure of the Security Mode Command message 1102, an RLC-ACK (Security Mode Command) message is not sent on the UL to the UTRAN 105.

The UE 102 then implements the procedure 800 shown in FIG. 8. At step S802 the UE 102 determines that a Cell Update procedure is to be initiated and therefore that a Cell Update Message is to be transmitted to the UTRAN 105.

The process 800 then proceeds to step S804. At step S804 the UE 102 determines if the transmission of a Cell Update message will abort an on-going Security Mode Command procedure.

Due to the transmission failure of the Security Mode Command message 1102 the UE 102 determines that a Security Mode Command procedure is not in progress at the UE 102 and the process 800 proceeds to step S806. At step S806 the UE 102 does not include a security status indicator in the Cell Update message. That is, the UE 102 does not include a security status indicator in the Cell Update message indicating normal operation of the UE 102 i.e. that the UE has not had to abort an on-going Security Mode Command procedure. The Cell Update message 1104 is then transmitted from the UE 102 to the UTRAN 105.

The RNC 206 then implements the procedure 1000 shown in FIG. 10. That is, the RRC layer 307 of the RNC 206 receives the Cell Update message 1104 at step S1002.

The process 1000 then proceeds to step S1003. At step S1003, the RNC 206 determines that a Security Mode Command procedure is in progress due to having transmitted Security Mode Command message 1102 to the UE 102 but has not yet received a Security Mode Command Complete message from the UE 102, therefore the RNC 206 aborts the Security Mode Command procedure and reverts back to the original security mode configuration at step S1004, and the process 1000 proceeds to step S1006.

At step S1006 the RRC layer 307 at the RNC 206 instructs the RLC layer 305 at the RNC 206 to perform an RLC re-establishment of all of the Acknowledged Mode signaling radio bearers (SRB2, SRB3, and SRB4). In response to receiving this instruction, the RLC layer 305 at the RNC 206 performs an RLC re-establishment of signaling radio bearers (SRB2, SRB3, and SRB4). This causes the Security Mode Command message 1102 that is being held in the RLC buffer at the RNC 206 associated with SRB2 whilst waiting for an acknowledgement from the UE 102 that the Security Mode Command message 1102 has been safely received at the UE 102 to be discarded from the RLC buffer at the RNC 206 associated with SRB2.

The discard of the Security Mode Command message 1102 from the RLC buffer at the RNC 206 associated with SRB2, results in the Security Mode Command message 1102 not being retransmitted from the RLC layer 305 of the RNC 206

(in contrast to FIG. 6 whereby a re-transmitted Security Mode Command message 608 is sent from the UTRAN 105 to the UE 102). The no-retransmission of the Security Mode Command message 1102 is indicated by the dashed arrow 1108 in FIG. 11.

It will be appreciated from the above that in the scenario shown in FIG. 11 a Security Mode Command message is not received at the UE 102. This is equivalent to the Security Mode Command procedure being aborted (the UE 102 continues to use an original security configuration). Furthermore the RNC 206 aborts the Security Mode Command procedure upon receiving the Cell Update message 1104 whilst the Security Mode Command procedure is on-going and reverts back to the original security mode configuration. This ensures the security configuration of the UE 102 and the UTRAN 105 are aligned.

Thus, the security configuration of the UE 102 and the UTRAN 105 are aligned without having to include a security status indicator in the Cell Update message 1104. This advantageously allows space (bits(s)) in the Cell Update message 1104 for 'Measured results on RACH' IEs to be included in the Cell Update Message 1104.

Should the UE 102 operating in accordance with FIG. 8 communicate with an RNC 206 operating in a conventional manner (not in accordance with FIG. 10), then the UE 102 would be unable to recover the scenario illustrated (and described above) in FIG. 6. However the UE 102 would still advantageously provide more detailed 'Measured results on RACH' IEs to the RNC 206 in the Cell Update message.

Embodiments have been described herein in relation to 3GPP specifications. The method and apparatus described herein are not intended to be limited to the specifications or versions thereof referred to herein but may be applicable to future versions or other specifications.

Whilst embodiments have been described herein in relation to UMTS, the method and apparatus described herein are not intended to be limited to this particular radio access technology and are also applicable to other radio access technologies (e.g. LTE).

Further, although the above has been described in terms of a substantially soft modern implementation, other implementations where more or even all of the described functions are implemented in dedicated hardware are not excluded.

As discussed above, the disclosure provides a wireless communications device comprising: a transceiver configured to facilitate wireless communications with a radio access network; and a processing unit configured to: determine, that a cell update message is to be transmitted to the radio access network; determine if a security mode configuration procedure for reconfiguring security parameters of the wireless communications device is in progress at the wireless communications device; if a security mode configuration procedure is in progress, abort the security mode configuration procedure and transmit a first type of cell update message to a network entity of the radio access network via the transceiver, the first type of cell update message including an indicator that the wireless communications device has aborted the security mode configuration procedure; and if a security mode configuration procedure is not in progress, transmit a second type of cell update message to the network entity of the radio access network via the transceiver, the second type of cell update message not including an indicator indicating that the wireless communications device has not had to abort an on-going security mode configuration procedure and in place of the indicator including information not pertaining to a security mode configuration procedure.

The information may comprise at least one measurement of the wireless communications device's radio environment.

The at least one measurement may comprise at least one measurement of a channel transmitted from a serving cell of the radio access network The at least one measurement may comprise at least one measurement of a channel transmitted from a neighbouring cell of the radio access network.

The at least one measurement of the wireless communications device's radio environment may comprise an Ec/N0 measurement.

The at least one measurement of the wireless communications device's radio environment may comprise a Received Signal Code Power measurement.

The at least one measurement of the wireless communications device's radio environment may comprise a path loss measurement.

The processing unit may be configured to determine that a security mode configuration procedure is in progress by determining that a security mode command message has been received at the wireless communications device and that an acknowledgement message has not been received from said network entity, the acknowledgement message acknowledging receipt, at the network entity, of a Security Mode Command Complete message transmitted from the wireless communications device.

The processing unit may be configured to conduct the security mode configuration procedure using a Radio Resource Control (RRC) layer of a protocol stack.

The processing unit may be configured to transmit the first type and second type of cell update message to the network entity using the RRC layer.

The indicator in the first type of cell update message may comprise an information element of the first type of cell update message. The indicator in the first type of cell update message may comprise one or more bits of the first type of cell update message.

The disclosure also provides a computer program product for implementing a cell update procedure at a wireless communications device comprising a transceiver configured to facilitate wireless communications with a radio access network, the computer program product comprising code embodied on a non-transient computer-readable medium and configured so as when executed on a processing apparatus of the wireless communications device to: determine that a cell update message is to be transmitted to the radio access network; determine if a security mode configuration procedure for reconfiguring security parameters of the wireless communications device is in progress at the wireless communications device; if a security mode configuration procedure is in progress, abort the security mode configuration procedure and transmit a first type of cell update message to a network entity of the radio access network via the transceiver, the first type of cell update message including an indicator that the wireless communications device has aborted the security mode configuration procedure; and if a security mode configuration procedure is not in progress, transmit a second type of cell update message to the network entity of the radio access network via the transceiver, the second type of cell update message not including an indicator indicating that the wireless communications device has not had to abort an on-going security mode configuration procedure and in place of the indicator including information not pertaining to a security mode configuration procedure.

The disclosure also provides a network entity of a radio access network, the network entity comprising: a network interface for facilitating wireless communications with a wireless communications device; at least one buffer for storing messages that have been transmitted to the wireless communications device, the at least one buffer configured to store a transmitted message until the network entity receives an acknowledgement acknowledging delivery of the message at the wireless communications device; and a processing unit configured to: receive a cell update message from the wireless communications device via the network interface; determine if a security mode configuration procedure for reconfiguring security parameters of the wireless communications device is in progress at the network entity; if a security mode configuration procedure is in progress at the network entity, abort the security mode configuration procedure and revert back to using original security parameters used prior to initiation of the security mode configuration procedure, and discard any message stored in the at least one buffer; and if a security mode configuration procedure is not in progress at the network entity, determine if the received cell update message comprises an indicator indicating that the wireless communications device has aborted a security mode configuration procedure completed at the network entity, wherein if the received cell update message comprises the indicator, the processing unit configured to revert back to using original security parameters used prior to completion of the security mode configuration procedure completed at the network entity.

If the received cell update message does not comprise the indicator the processing unit configured to use new security parameters, that the processing unit is configured to use following completion of the security mode configuration procedure completed at the network entity, to transmit a cell update confirm message to the wireless communications device via the network interface.

If the processing unit reverts back to using original security parameters, the processing unit may be further configured to transmit a cell update confirm message to the wireless communications device via the network interface using the original security parameters.

The processing unit may be configured to determine that a security mode configuration procedure is in progress by determining that a security mode command message has been transmitted to the wireless communications device and that a security mode command complete message has not been received from the wireless communications device.

The discard may comprise discarding the security mode command message stored in the at least one buffer.

The processing unit may be configured to conduct the security mode configuration procedure using a Radio Resource Control (RRC) layer of a protocol stack.

The processing unit may be configured to receive the cell update message using the RRC layer. If the cell update message is received whilst a security mode configuration procedure is in progress at the network entity, the RRC layer may be configured to generate a cell update confirm message for transmission to the wireless communications device, the cell update confirm message comprising an instruction to the wireless communications device to discard any message stored in at least one buffer at the wireless communications device arranged to store transmitted messages until the wireless communications device receives an acknowledgement acknowledging delivery of said message at the network entity.

The processing unit may be configured to perform the discard at a Radio Link Control (RLC) layer of the protocol stack based on the RLC layer receiving an instruction from said RRC layer.

The network entity may comprise a Radio Network Controller, and the network interface may be configured to be coupled to a base station for facilitating wireless communications with the wireless communications device.

The network entity may comprise a base station, and the network interface may comprise a transceiver configured to facilitate wireless communications with the wireless communications device.

Additionally, the disclosure provides a computer program product for implementing a cell update procedure at a network entity, the network entity comprising a network interface for facilitating wireless communications with a wireless communications device and at least one buffer for storing messages that have been transmitted to the wireless communications device, the at least one buffer configured to store a transmitted message until the network entity receives an acknowledgement acknowledging delivery of the message at the wireless communications device, the computer program product comprising code embodied on a non-transient computer-readable medium and configured so as when executed on a processing apparatus of the network entity to: receive a cell update message from the wireless communications device via the network interface; determine if a security mode configuration procedure for reconfiguring security parameters of the wireless communications device is in progress at the network entity; if a security mode configuration procedure is in progress at the network entity, abort the security mode configuration procedure and revert back to using original security parameters used prior to initiation of the security mode configuration procedure, and discard any message stored in the at least one buffer; and if a security mode configuration procedure is not in progress at the network entity, determine if the received cell update message comprises an indicator indicating that the wireless communications device has aborted a security mode configuration procedure completed at the network entity, wherein if the received cell update message comprises the indicator, the processing unit configured to revert back to using original security parameters used prior to completion of the security mode configuration procedure completed at the network entity.

A portion of the above-described apparatuses, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

While this disclosure includes various embodiments, it will be understood to those skilled in the art that various changes in form and detail may be made without departing from the scope of the disclosure as defined by the appended claims.

The invention claimed is:

1. A wireless communications device comprising:
a transceiver configured to facilitate wireless communications with a radio access network; and
a processing unit configured to:
  determine, that a cell update message is to be transmitted to the radio access network, said cell update message having an information element;
  determine if a security mode configuration procedure for reconfiguring security parameters of the wireless communications device is in progress at the wireless communications device;
  if a security mode configuration procedure is in progress, abort said security mode configuration procedure and transmit a first type of said cell update message to a network entity of the radio access network via the transceiver, the first type of said cell update message including an indicator in said information element that the wireless communications device has aborted said security mode configuration procedure; and
  if a security mode configuration procedure is not in progress, transmit a second type of the cell update message to the network entity of the radio access network via the transceiver, the second type of said cell update message not including an indicator in said information element indicating that the wireless communications device has not had to abort an on-going security mode configuration procedure and in place of said indicator including information not pertaining to a security mode configuration procedure.

2. The wireless communications device according to claim 1, wherein said information comprises at least one measurement of the wireless communications device's radio environment.

3. The wireless communications device according to claim 2, wherein said at least one measurement comprises at least one measurement of a channel transmitted from a serving cell of the radio access network.

4. The wireless communications device according to claim 2, wherein said at least one measurement comprises at least one measurement of a channel transmitted from a neighbouring cell of the radio access network.

5. The wireless communications device according to claim 2, wherein said at least one measurement of the wireless communications device's radio environment comprises an Ec/NO measurement.

6. The wireless communications device according to claim 2, wherein said at least one measurement of the wireless communications device's radio environment comprises a Received Signal Code Power (RSCP) measurement.

7. The wireless communications device according to claim 2, wherein said at least one measurement of the wireless communications device's radio environment comprises a path loss measurement.

8. The wireless communications device according to claim 1, wherein the processing unit is configured to determine that a security mode configuration procedure is in progress by determining that a security mode command message has been received at the wireless communications device and that an acknowledgement message has not been received from said network entity, the acknowledgement message acknowledging receipt, at the network entity, of a Security Mode Command Complete message transmitted from the wireless communications device.

9. The wireless communications device according to claim 1, wherein the processing unit is configured to abort said security mode configuration procedure and revert back to using original security parameters used prior to initiation of said security mode configuration procedure in response to transmitting said first type of said cell update message to said network entity.

10. The wireless communications device according to claim 1, wherein the processing unit is configured to conduct the security mode configuration procedure using a Radio Resource Control (RRC) layer of a protocol stack.

11. The wireless communications device according to claim 10, wherein the processing unit is configured to transmit the first type and second type of said cell update message to said network entity using said RRC layer.

12. The wireless communications device according to claim 1, wherein the indicator in the first type of said cell update message comprises one or more bits of the first type of said cell update message.

13. A computer program product for implementing a cell update procedure at a wireless communications device comprising a transceiver configured to facilitate wireless communications with a radio access network, the computer program product comprising code embodied on a non-transient computer-readable medium and configured so as when executed on a processing apparatus of the wireless communications device to:
  determine that a cell update message is to be transmitted to the radio access network said cell update message having an information element;
  determine if a security mode configuration procedure for reconfiguring security parameters of the wireless communications device is in progress at the wireless communications device;
  if a security mode configuration procedure is in progress, abort said security mode configuration procedure and transmit a first type of said cell update message to a network entity of the radio access network via the transceiver, the first type of said cell update message including an indicator in said information element that the wireless communications device has aborted said security mode configuration procedure; and
  if a security mode configuration procedure is not in progress, transmit a second type of said cell update message to the network entity of the radio access network via the transceiver, the second type of said cell update message not including an indicator in said information element indicating that the wireless communications device has not had to abort an on-going security mode configuration procedure and in place of said indicator including information not pertaining to a security mode configuration procedure.

14. A network entity of a radio access network, the network entity comprising:
  a network interface for facilitating wireless communications with a wireless communications device;
  at least one buffer for storing messages that have been transmitted to the wireless communications device, the at least one buffer configured to store a transmitted message until the network entity receives an acknowledgement acknowledging delivery of said message at the wireless communications device; and a processing unit configured to:
receive a cell update message having an information element from said wireless communications device via said network interface;
determine if a security mode configuration procedure for reconfiguring security parameters of the wireless communications device is in progress at the network entity;
if a security mode configuration procedure is in progress at the network entity, abort said security mode configuration procedure and revert back to using original security parameters used prior to initiation of said security mode configuration procedure, and discard any message stored in said at least one buffer; and
if a security mode configuration procedure is not in progress at the network entity, determine if said information element of the received cell update message comprises an indicator indicating that the wireless communications device has aborted a security mode configuration procedure completed at the network entity or information not pertaining to a security mode configuration procedure, wherein if the received cell update message comprises said indicator, the processing unit configured to revert back to using original security parameters used prior to completion of said security mode configuration procedure completed at the network entity.

15. The network entity according to claim 14, wherein if the received cell update message does not comprise said indicator the processing unit configured to use new security parameters, that the processing unit is configured to use following completion of said security mode configuration procedure completed at the network entity, to transmit a cell update confirm message to the wireless communications device via said network interface.

16. The network entity according to claim 14, wherein if the processing unit reverts back to using original security parameters, the processing unit further configured to transmit a cell update confirm message to the wireless communications device via said network interface using said original security parameters.

17. The network entity according to claim 14, wherein the processing unit is configured to determine that a security mode configuration procedure is in progress by determining that a security mode command message has been transmitted to the wireless communications device and that a security mode command complete message has not been received from said wireless communications device.

18. The network entity according to claim 17, wherein said discard comprises discarding said security mode command message stored in said at least one buffer.

19. The network entity according to claim 14, wherein the processing unit is configured to conduct the security mode configuration procedure using a Radio Resource Control (RRC) layer of a protocol stack.

20. The network entity according to claim 19, wherein the processing unit is configured to receive the cell update message using said RRC layer.

21. The network entity according to claim 19, wherein if the cell update message is received whilst a security mode configuration procedure is in progress at the network entity, said RRC layer configured to generate a cell update confirm message for transmission to the wireless communications device, said cell update confirm message comprising an instruction to the wireless communications device to discard any message stored in at least one buffer at the wireless communications device arranged to store transmitted messages until the wireless communications device receives an acknowledgement acknowledging delivery of said message at the network entity.

22. The network entity according to claim 21, wherein the processing unit is configured to perform said discard at a Radio Link Control (RLC) layer of said protocol stack based on the RLC layer receiving an instruction from said RRC layer.

23. The network entity according to claim 14, wherein the network entity comprises a Radio Network Controller.

24. The network entity according to claim 23, wherein the network interface is configured to be coupled to a base station for facilitating wireless communications with the wireless communications device.

25. The network entity according to claim 14, wherein the network entity comprises a base station.

26. The network entity according to claim 25, wherein the network interface comprises a transceiver configured to facilitate wireless communications with the wireless communications device.

27. A computer program product for implementing a cell update procedure at a network entity, the network entity comprising a network interface for facilitating wireless communications with a wireless communications device and at least one buffer for storing messages that have been transmitted to the wireless communications device, the at least one buffer configured to store a transmitted message until the network entity receives an acknowledgement acknowledging delivery of said message at the wireless communications device, the computer program product comprising code embodied on a non-transient computer-readable medium and configured so as when executed on a processing apparatus of the network entity to:
receive a cell update message having an information element from said wireless communications device via said network interface;
determine if a security mode configuration procedure for reconfiguring security parameters of the wireless communications device is in progress at the network entity;
if a security mode configuration procedure is in progress at the network entity, abort said security mode configuration procedure and revert back to using original security parameters used prior to initiation of said security mode configuration procedure, and discard any message stored in said at least one buffer; and
if a security mode configuration procedure is not in progress at the network entity, determine if said information element of the received cell update message comprises an indicator indicating that the wireless communications device has aborted a security mode configuration procedure completed at the network entity or information not pertaining to a security mode configuration procedure, wherein if the received cell update message comprises said indicator, the processing unit configured to revert back to using original security parameters used prior to completion of said security mode configuration procedure completed at the network entity.

* * * * *